United States Patent [19]

Maxham et al.

[11] 3,908,113

[45] Sept. 23, 1975

[54] COMPUTER CONTROLLED OPTICAL SORT SYSTEM

[75] Inventors: Kenneth Y. Maxham, Richardson; Richard A. Houghton, Dallas, both of Tex.

[73] Assignee: The Boeing Company, Seattle, Wash.

[22] Filed: Nov. 13, 1973

[21] Appl. No.: 415,313

[52] U.S. Cl. .................... 235/61.7 R; 235/61.11 E

[51] Int. Cl.² .......................................... G06K 7/10

[58] Field of Search ............... 104/88; 340/146.3 K; 235/61.11 E, 61.7 R

[56] References Cited

UNITED STATES PATENTS

| | | | |
|---|---|---|---|
| 3,679,874 | 7/1972 | Fickenscher | 235/61.11 E |
| 3,784,791 | 1/1974 | Pease | 340/146.3 K |

*Primary Examiner*—Stanley M. Urynowicz, Jr.
*Attorney, Agent, or Firm*—Richards, Harris & Medlock

[57] ABSTRACT

A material unit, such as a vehicle for supporting luggage and articles of similar configuration, is guided around a track layout from a check-in station to a remote distribution station by a central computer in communication with an array of local station computers. Mounted on the material unit is a light reflective vehicle identification bar code that is optically read as the unit moves around the track layout. A unit destination code is input to the central computer that also receives the vehicle identification code from the optical reader and compiles a routing sequence that is communicated to selected ones of the local station computers. As the material unit approaches a local station, an optical reader responds to the bar code and an identification signal is transmitted to the local station computer for comparison with the routing sequence. The material unit is either diverted to a selected remote distribution station or allowed to pass to the next local station in accordance with the comparison sequence. Throughout the movement of the material unit around the track layout, the central computer, in conjunction with the local station computers, monitors the material unit for guidance to the selected destination. The central computer also maintains each material unit in an en route routine to insure that the location of each material unit is known at all times and to provide a warning indication when a unit fails to reach its destination and is lost.

17 Claims, 9 Drawing Figures

COMPUTER CONTROLLED OPTICAL SORT SYSTEM

This invention relates to a material handling system for rapid transfer of tracked vehicles from a check-in station to a remote distribution station. More particularly, the present invention contemplates an article handling transfer system for automatically guiding a material unit from a check-in station to a remote distribution station.

Although described with emphasis on baggage handling from a check-in station to a remote distribution station, the invention also finds application in warehousing conveyor systems wherein material units are utilized to transfer articles between stations. A material unit may be either a track mounted vehicle as described herein, or a container moving along a belt type conveyor. In the track mounted vehicle system, each vehicle contains an identifying bar code permanently attached thereto. In the container type system, each container includes a permanently attached identification bar code.

Heretofore, most material handling system, regardless of the type of control applied to the movement of the material units, were limited in that the units were diverted from the circulating system in the order in which they appeared at a remote station. For example, if at a particular station or location along the conveyor system a number of material units are to be diverted, such diverting took place in the order in which the units arrived at the station.

Recently, magnetic memory tabs have been affixed to the material units and these tabs are dynamically encoded to guide a particular material unit around a track layout to a particular remote station. Such magnetic memory tabs are difficult to accurately encode dynamically with the material unit traveling at full speed and numerous errors resulted in diverting a particular material unit from its desired destination. The reading and coding processes required close physical contact and alignment, resulting in mechanical wear and damage to the contacting parts. Further, the reading stations for such magnetic memory tabs presented a problem of reliability and if certain critical read stations became inoperative, all material units in the system were effectively lost.

Specifically with regard to baggage handling, it is a matter of general knowledge that at the present time the transportation of personal luggage presents substantial problems not only for the airline companies, but also for the passengers and is foreseeable that these problems will be increased with the increase in size of aircraft and the number of passengers.

Passengers now deliver their luggage upon arrival at an air terminal and the airline company issues a receipt for the number of bags checked. This practice is not always followed for so-called shuttle flights of short duration. The bags are either loaded directly on small trucks which take them to the designated aircraft or they are conveyed to an area immediately out of sight from the check-in station where they are then loaded on the small trucks for transportion to the aircraft. Since any one check-in station for a particular airline receives passengers for most, if not all, of the line's flights, a considerable amount of confusion results from the scurrying of the small trucks between the various check-in stations and the aircraft into which the individual bags are destined.

As a result of this behind the scenes confusion, the experience of some passengers is that their bags or their contents have been damaged during transportion for any number of various reasons. Other passengers have lost their baggage, in large measures due to the confusion caused by the operators of the small trucks in attempting to deliver all checked-in luggage to one of many aircraft.

In accordance with the present invenion, a material handling system includes an optical code reader responsive to an identification code carried by individual material units. The optical code reader generates identification data representing the identification code carried by the individual material units. A feature of the present invention is that the optical code reader does not require physical contact or precise alignment with the code carrying device.

The identification code contains redundant information for the purpose of detecting possible errors in the reading process induced by the collection of dirt on or by damage to the optical code reader or the code carrying device attached to the vehicle. This identification data is transferred to a central storage controller that maintains a file of destination codes and corresponding unit identification codes. Additional optical code readers are located throughout the system at change of direction locations and each responds to the identification code to generate identification data representing the code carried by a passing material unit. At various local stations throughout the system, a local storage controller responds to the identification data from one of the array of optical code readers and the destination codes from the central controller to generate a unit direction signal to the change of direction location in accordance with the destination code transmitted thereto. At any one of a number of unload remote stations, another optical code reader generates identification data representing a passing material unit. This data is again transmitted to a local storage controller that has previously received a destination code and upon a proper comparison generates a direction signal to the associated unload remote station to divert a selected material unit to be unloaded.

In addition to baggage sorting, the system of the present invention is also intended to function to route, segregate, and record the movement of material units in addition to other warehousing functions. It is contemplated that these functions are to be performed by automatic mechanisms controlled by a central storage controller and/or local controllers in accordance with an optically read code carried by each material unit. For some warehousing systems, the optical read identification code may be utilized by the central storage controller for inventorying the ultimate destination at a remote station of a particular materials unit. An important feature of the invention is thus the use of an optically read code with a central storage controller. Another important feature is that each vehicle carries a fixed identification code with no requirement to change this code. Also, the central controller controls the functions of routing, segregating, and recording the movements of the articles using the vehicle identification codes. Also, the central controller can monitor the functioning of the local stations.

A more complete understanding of the invention and its advantages will be apparent from the specification and claims and from the accompanying drawings illustrative of the invention.

Referring to the drawings.

Figures 1, 7:
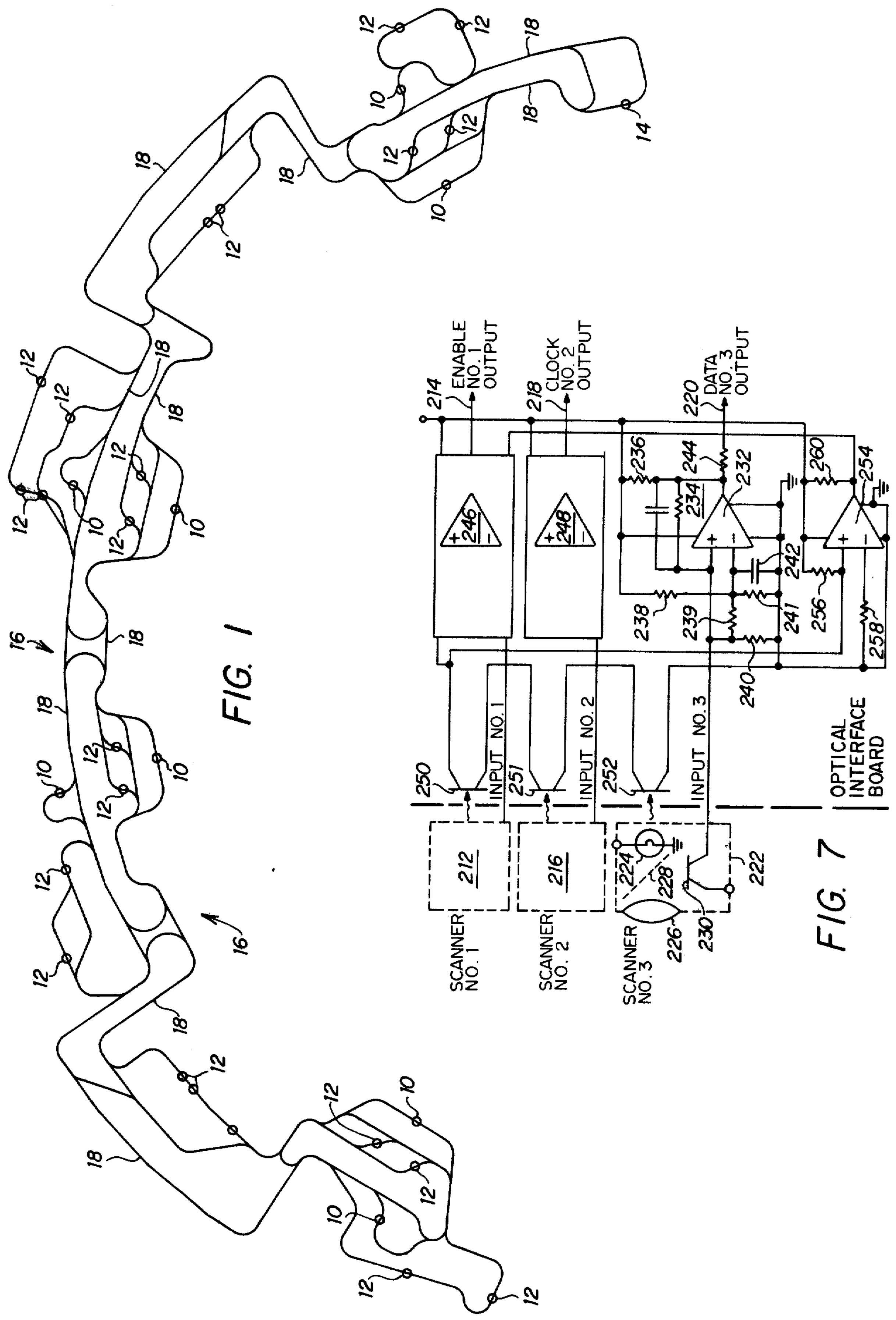
FIG. 1 is a plan view of a track layout having a plurality of check-in stations and an array of remote unloading stations in a typical baggage handling system.
FIG. 7 is a schematic diagram of an optical read station as utilized in the system of the present invention.

Referring to FIG. 1, there is shown a track layout for a baggage handling system having check-in or loading stations 10 and remote unloading stations 12. Also included in the track layout is an automatic lifting station 14 for raising baggage from one level to a second level.

It should also be pointed out that the various stations of the track layout of FIG. 1 may be at different elevations. Thus, although it appears that the unload stations 12 and load stations 10 are in the same area, in an actual construction of the system represented by this track layout, the check-in stations and unload stations are widely separated and in some locations at different levels. As illustrated in FIG. 1, the track layout comprises three basic sections separated by high speed turnarounds 16. This results in a first track section to the far left and a second larger section to the right and a small intermediate section.

Although not specifically limited thereto, the check-in stations 10 and unload stations 12 may be of the type described in the copending application of Ivan Johnson, entitled ARTICLE HANDLING TRANSFER MECHANISM, Ser. No. 226,909, filed Feb. 16, 1972 now U.S. Pat. No. 3,804,274. Throughout the track layout there are numerous change of direction locations and each such location is equipped with divert ramps and divert plates such as described in the copending application of Ivan Johnson, entitled INERTIA SWITCHING, Ser. No. 194,576, filed Nov. 1, 1971 now U.S. Pat. No. 3,841,225. Both of the above applications are assigned to the assignee of the present invention.

Basically, the vehicles traveling on the track layout of FIG. 1 are wheeled carts capable of holding several pieces of passenger luggage for transporting from a check-in station to an unload station at a designated airport terminal gate for loading into a particular aircraft. These carts are propelled along the track layout by linear motors and are controlled at each of the check-in stations 10 and unload stations 12 and the various change of direction locations by braking magnets responding to control signals. These control signals are generated as a result of optically reading an identification bar code permanently affixed to each cart. The bar code permanently attached to a particular cart comprises a series of light and dark rectangularly shaped areas that comprise an identification number for the particular cart. This bar code, as attached to each cart, must be read at various stations around the track layout to guide the cart from any one check-in station 10 to any one designated unload station 12.

Figure 2:
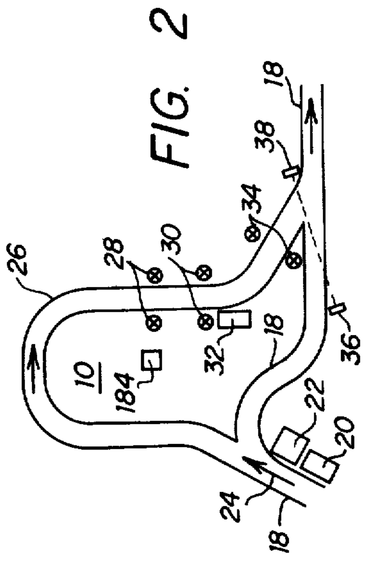
FIG. 2 is an enlarged view of one portion of the track layout of FIG. 1 showing a typical check-in station.

Referring to FIG. 2, there is shown a typical track arrangement for a check-in station wherein a vehicle moving along a main line 18 passes an optical code reader 20 that responds to the bar code on the vehicle for generating signals switch to be utilized in a control system for actuating a switch controller 22. By selectively energizing the switch controller 22, a vehicle approaching in the direction of the arrow 24 will continue on the main line 18 and not be diverted into the check-in station 10. When required, however, the swithc controller 22 is actuated to divert a vehicle onto a spur track 26 for loading at a check-in station. At the check-in station, the vehicle is positioned by the magnetic stops 28 and 30. This check-in station or loading station may be of the type described in the copending application of Ivan Johnson, Ser. No. 226,909. After bags have been loaded into the vehicle at the check-in station, an attendant keys in by means of a push-button console (not shown) a destination code that is transmitted to the control system, to be described. As the loaded vehicle leaves the check-in station, an optical code reader 32 again responds to the identification bar code to generate identification data also transmitted to the control system.

halted at magnetic stops 34 to await a merge signal to be returned to the main line 18. This merge signal is generated when the main line is determined to be available for an additional vehicle. This determination is made by directing a light beam from a source 36 to a light sensor 38. If this light beam is interrupted, the main line is not available. An uninterrupted path between the source 36 and the light sensor 38 indicates a clear main line and a vehicle at the magnetic stops 34 is accelerated onto the main line 18.

Figure 3:
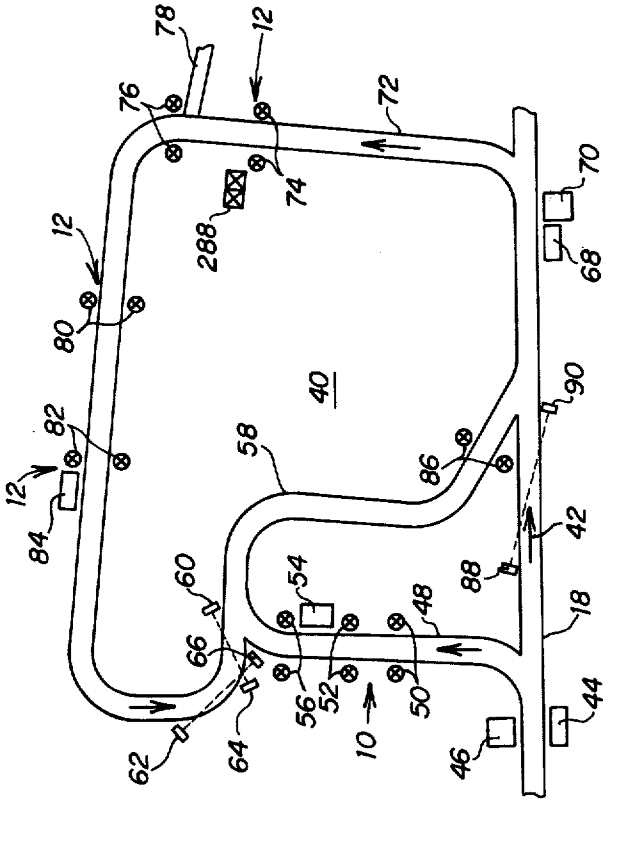
FIG. 3 is an enlarged view of another section of the track layout of FIG. 1 showing a check-in station in combination with a remote unload station.

Referring to FIG. 3, there is shown a check-in station 10 and three unload stations 12 on the same track loop 40. A vehicle traveling on the main line 18 in the direction of the arrow 42 passes an optical code reader 44 wherein the identification code is read, and for selected vehicles an energizing signal is applied to a switch controller 46 to divert a cart from the main line 18 onto the spur track 48 to magnetic stops 50 and 52 at the check-in station 10. A loaded vehicle leaving the station 10 passes an optical code reader 54 and is held at a magnetic stop 56 for a clear track before being accelerated onto a spur track 58. A clear track is determined by light from sources 60 and 62 directed to light sensors 64 and 66, respectively. The check-in station 10 of FIG. 3 is thus quite similar to the check-in station of FIG. 2.

A vehicle not diverted onto the spur track 48 continues along the main line 18 to an optical code reader 68. Again the identification bar code is read and identification data is transmitted to the local control system, and for selected vehicles an energizing signal is transmitted to a switch controller 70 to divert the vehicle onto a spur track 72 to one of three unload stations 12. At the first unload station, a vehicle is halted at magnetic stops 74 and 76 for unloading onto a conveyor 78. This unload station is of the type described in the co-pending application of Ivan Johnson, Ser. No. 226,909.

Vehicles not unloaded at the conveyor 78 continue to either magnetic stops 80 and 82 at two manual unload stations 12 on the track 72. An empty vehicle leaving the unload stations and passing the magnetic stop 82 proceeds along the spur track 72 past an optical code reader 84 wherein the identification bar code is read and transmitted to the local control system; it is then relayed to the central control system as identification data for an empty vehicle. This vehicle is then accelerated to the track section 58.

Vehicles from either the check-in station 10 or the unload stations 12 on track 58 are halted at a magnetic stop 86 until a clear section of main line 18 is detected by light from a source 88 directed to a light sensor 90. When receiving a clear track indication from the local control system in response to an uninterrupted light path to the light sensor 90, a vehicle at the magnetic stop 86 is accelerated onto the main line 18 to be directed to a destination as established by the central control system.

Figure 4:
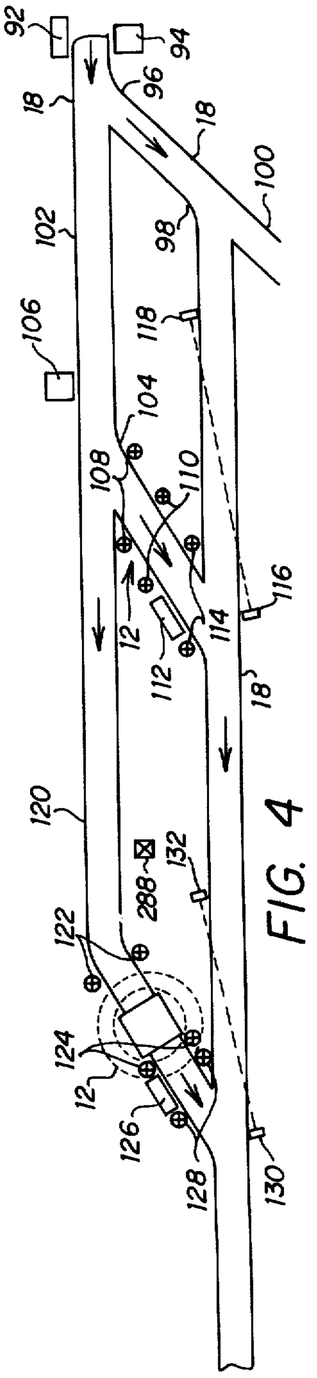
FIG. 4 is an enlarged view of another section of the track layout of FIG. 1 showing two unload stations at the same remote location.

Referring to FIG. 4, there is shown another track arrangement for unload stations 12. A vehicle approaching on the main line 18 passes an optical code reader 92 wherein the identification bar code is read and identification data is transmitted to the local controller. Vehicles not destined for the unload stations 12 are diverted onto the main line 18 by energizing a switch controller 94 that controls diverters at the change of direction locations 96 and 98. Certain selected vehicles passing the optical code reader 92 are diverted into the spur track 100 that leads to one of the check-in stations 10 on the inner circle of the track layout of FIG. 1. Vehicles intended for travel on the main line are diverted at the change of direction location 98 and continue on the main line 18.

Selected vehicles passing the optical code reader 92 advance onto a spur track 102 and either continue on this track or be diverted onto a spur track 104 at an unload station 12. To be diverted onto the spur track 104, a signal from the local control system actuates a switch controller 106. A vehicle directed to the spur track 104 is halted at magnetic stops 108 and 110 for unloading. The empty vehicle then proceeds past an optical code reader 112 and is halted at magnetic stops 114 until a clear main track signal is received from the local controller in response to a light sensor 116 receiving energy from a light source 118. A clear track signal from the local controller actuates motors for accelerating a vehicle onto the main line 18, sending the vehicle on its way to a predetermined destination.

Other vehicles directed onto the spur track 102 continue onto a spur track 120 to an unload station 12 parallel to the station on the spur track 104. A vehicle entering the unload station 12 on the spur track 120 is halted at magnetic stops 122 and 124 for unloading. An unloaded vehicle is moved from the station 12 past an optical code reader 126 to be halted at magnetic stops 128 until a clear main track signal is received from the local controller in response to a light sensor 130 receiving energy from a source 132.

FIGS. 2–4 illustrate various arrangements for the check-in stations 10 and the unload stations 12 around the track layout of FIG. 1. Each station is preceded by an optical code reader that responds to the identification bar code carried by passing vehicles to generate identification data for a local control system. The local control system responds to the identification data by comparing this data against a table of destination control data, consisting of temporarily stored destination control signals previously transmitted to the local control system from the central control system. As the result of this comparison, the local controller will generate signals to switch controllers for diverting vehicles along the main track 18 to spur tracks for either the check-in stations 10 or the unload stations 12. When leaving either the check-in stations 10 or the unload stations 12, a vehicle again passes an optical code reader where the identification bar code is read for transmittal to the central control system. The central control system responds to the identification data by generating destination control signals which are transmitted to selected local controllers, where they are temporarily stored, to be subsequently used for identifying and diverting vehicles from the main track. The local controllers that are selected are determined by the required route from the point which the vehicle is leaving to its destination. A vehicle is then halted prior to re-entering the main line 18 until a clear track is determined. Determination of a clear main line is made in response to signals from light sensors positioned along the main track immediately preceding the entry location from a spur track.

Figure 5:
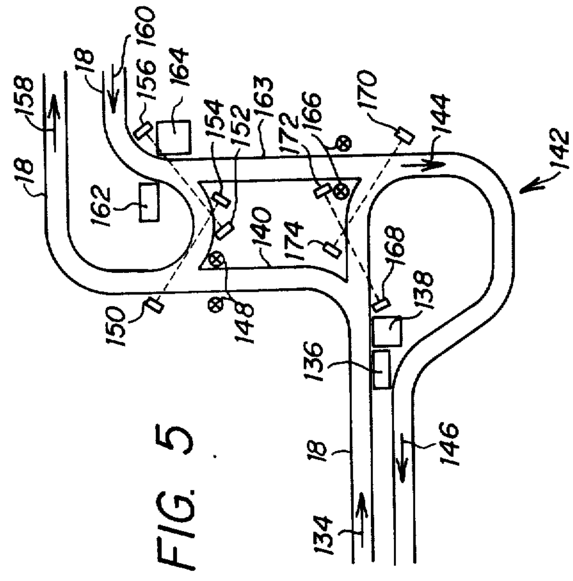
FIG. 5 is an enlarged view of the track layout of FIG. 1 showing a turn around section between various segments of the overall track layout.

Referring to FIG. 5, there is shown one of the high speed turnarounds 16 separating the three sections of the track layout. To avoid dispatching a vehicle to a far end of the layout of FIG. 1, the high speed turnarounds 16 are provided. A vehicle entering the high speed turnaround 16 of FIG. 5 on the main line 18 in the direction of the arrow 134 passes an optical code reader 136 where the vehicle identification bar code is read. Selected identification codes cause an energizing signal to be sent to a switch controller 138 for diverting a vehicle onto a track section 140. Vehicles not diverted onto the track section 140 continue on the main line 18 around a track loop 142 in the direction of the arrows 144 and 146. Thus, a vehicle passing the optical code reader 136 may merely reverse directions on the main line 18. Other vehicles will be diverted onto the spur track 140 and halted at magnetic stops 148 to wait for a clear track signal generated by the local controller in response to signals from light sensors 150 and 152 receiving energy from sources 154 and 156, respectively. A clear track signal from the sensors 150 and 152 as applied to a local controller releases a vehicle from the magnetic stop 148 for acceleration onto the main line 18 in the direction of the arrow 158.

As illustrated in FIG. 5, this high speed turnaround separates the intermediate loop from the far right loop. Vehicles traveling in the far right loop of the track layout of FIG. 1 along the main line 18 proceed in the direction of the arrow 160 and pass an optical code reader 162 for return to the right section over the main line 18 in the direction of the arrow 158 or may be diverted onto the spur track 163. Control of the vehicles at the change of direction location for the optical code reader 162 is completed by energizing a switch controller 164. A vehicle entering the spur track 163 is halted at magnetic stops 166 until a clear track signal is generated by the central controller in response to a signal from light sensors 168 and 170 responsive to light energy from sources 172 and 174, respectively. Upon receiving a clear track signal a vehicle at the magnetic stops 166 proceeds along the main line 18 in the direction of the arrow 144. Thus, the high speed turnaround will reverse a car's direction on the main line or transfer the car from one segment to the adjoining segment of the track layout.

Figure 6:
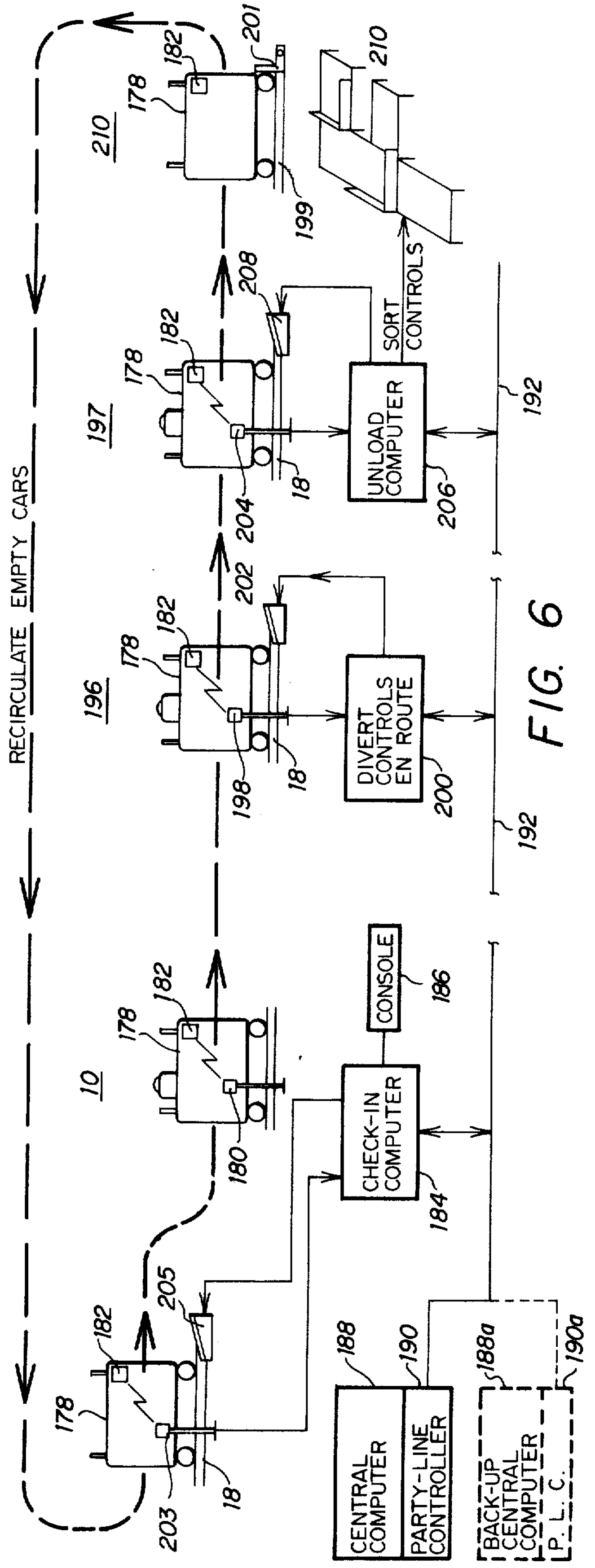
FIG. 6 is a block layout, line diagram illustrating the movement of a material unit through the system.

Referring to FIG. 6, there is shown a schematic of the central control system for guiding vehicles around the track layout of FIG. 1. A vehicle 178 at a check-in station 10 is ready for loading with passenger baggage. After completing the loading operation an optical code reader 180 senses the vehicle's identification bar code 182, typically comprising a permanent retroreflective tape encoded with a bar code. Identification data signals from the optical code reader 180 are transmitted to a check-in computer 184 at the check-in station 10. Also connected to the check-in computer 184 is an encoding console 186 for inputing to the central controller a destination code for the vehicle 178. Both the vehicle identification code data and the destination code data, as stored in the computer 184, are transferred to a central computer 188, as part of a central controller, through a party line controller 190 over a party line bus 192. The central computer 188 then generates routing data which is transmitted over the party line bus 192 to selected local station computers. The selected local station computers are those which are required to cause change of direction to guide the vehicle to its proper destination.

The check-in computer 184 and other local station computers are coupled to the central computer 188 on a standard polling basis. That is, the party line controller 190 sequentially polls each of the remote station computers to determine if a message is available for transmitting to the central computer 188. Each time the party line controller 190 identifies a remote station computer as having a message for the central computer, an interconnection is made and the polling sequence stops until the message has been transmitted. Similarly, coded messages are transmitted from the central computer 188 on a polling basis. To provide for more reliable operation of the system, a backup central computer 188a with an associated backup party line controller 190a is also coupled to the party line bus 192.

The vehicle 178 leaves the check-in station for merging on the main line 18. Once on the main line 18, the vehicle 178 moves past the various change of direction locations such as identified by the reference number 196. At each such location, an optical code reader 198 responds to the identification bar code 182 to generate identification data to a local station computer 200. Previously, the computer 200 has received routing data from the central computer 188; this routing data is stored in the memory in the computer 200. An evaluation of the vehicle identification data and the routing data is made in the computer 200, and for preselected vehicles an energizing signal is sent to a switch controller 202 to change the direction of the vehicle 178 from the main line 18 to the spur line. The vehicle 178 continues either on the main line 18 or the spur line to the preselected unload station as identified in the routing data transmitted from the central computer 188 to each of the local station computers.

At the selected unload station 197, an optical code reader 204 responds to the identification bar code 182 and sends to an unload station computer 206 identification data. In the unload station computer 206, the identification data is evaluated with reference to the routing data previously stored in the computer and an energizing signal is sent to a switch controller 208 for shunting the vehicle 178 from the main line 18 onto the spur line 199 for a preselected unload station. When the vehicle 178 is positioned at the magnetic stops 201 of the unload station, the computer 206 provides control signals to an unload and sorting station 210, such as described in the copending application of Ivan Johnson, Ser. No. 226,909.

After the vehicle 178 has been unloaded, its identification code is again transmitted to the central computer 188 over the party line bus 192. The central computer 188 then generates routing data for the empty vehicle to be recirculated back to a check-in station. The routing data as before is transmitted over the party line bus 192 to selected local station computers. The empty vehicle is released from the unload station and returned to the main line. The vehicle is routed to a check-in station to again repeat the sequence. An empty vehicle is diverted through the track layout of FIg. 1 in the same manner as a loaded vehicle. That is, an optical code reader at each change of direction location sends identification data to a local computer for evaluation and comparison to routing data stored in the remote local station computers. As the empty vehicle approaches its destination, an optical code reader 203 responds to the identification bar code 182 and sends to the check-in computer the identification data. The switch controller 205 is energized for shunting the vehicle 178 from the main line 18 onto the spur line, where the vehicle will wait to be reloaded.

Referring to FIG. 7, there is shown a schematic of an optical code reader wherein three individual scanning circuits respond to the identification bar code 182 on each of the vehicles 178. A scanner 212 responds to a first line of bar codes to generate an enable output on a line 214 to the check-in computer 184. A scanner 216 responds to a second line of bar codes to generate clock output pulses on a line 218, also to the computer 184. Identification data from the bar code 182 is generated on a line 220 from a scanner 222.

Each of the scanners and associated circuitry to generate the various output signals to the computer 184 is similar. Referring to the scanner 222, a light source 224 provides energy through a lens 226 to the retroreflective bar code 182. Light reflecting from the bar code 182 is again transmitted through the lens 226 and reflected from a partially reflective mirror 228 onto a photodiode 230. A signal from the photodiode 230 is applied to one input of a differential switching amplifier 232 having a feedback circuit 234 and coupled to a supply voltage through a resistor 236. The second input to the amplifier 234 is generated by a resistance network including resistors 238–241; the latter connected in parallel with a capacitor 242. An output from the amplifier 232 is coupled to the line 220 through an output resistor 244.

As mentioned, each of the scanners is similar and coupled to the identical identifying circuit. The scanner 212 couples to an amplifier 246 and the scanner 216 couples to an amplifier 248.

Associated with each of the light sources of the scanners 212, 216 and 222 is a filament monitoring circuit comprising photodiodes 250–252 connected in series to one input of a differential amplifier 254. An output of the amplifier 254 is applied to one input of the amplifier 246 to control the operation thereof upon a failure of any one of the light sources. Circuitry associated with the amplifier 254 includes a divider network of resistors 256 and 258. Also connected to the output of the amplifier 254 is a resistor 260.

Output data from each of the scanners is coupled to one of the local station computers for a comparison with routing data, or in the case of the check-in computer, for transmittal to the central controller for establishing routing data.

Figure 8:
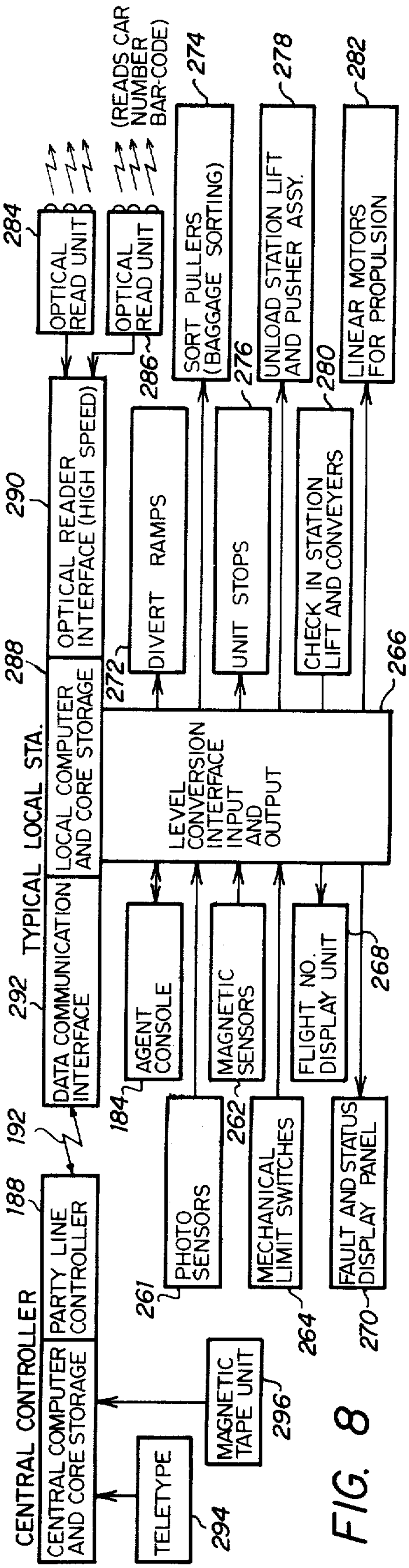
FIG. 8 is a block diagram showing the general equipment configuration of a central controller with memory storage and an interconnection to a typical local station.

Referring to FIG. 8, there is shown a block diagram of a typical local station coupled to the central computer 188 through the party line controller 190 over a data transmission link (party line) 192.

At a typical local station there is connected to the local station computer various peripheral equipment such as the agent's console 184 for keying-in a destination code. To perform the various loading and unloading functions as described in the copending application of Ivan Johnson, Ser. No. 226,909, photo sensors 261, magnetic sensors 262 and mechanical limit switches 264 are connected to the computer through an interface network 266. Also connected to the computer through the interface network 266 is a display unit 268 and a fault and status panel 270. Each piece of the peripheral equipment, as illustrated to the left of the interface network 266, provides data signals to the local station computer.

Equipment illustrated to the right of the interface network 266 is controlled in accordance with output signals generated by the local station computer. Such controlled equipment includes a divert controller 272, a baggage sorting controller 274, such as located along the conveyor 78, and vehicle stop controls 276, such as the magnetic stops 28, 30 or 34 of FIG. 2. Also controlled by the output signals from the local station computer are an unload station 278, a check-in station 280 and linear motors 282 for imparting motion to the vehicles as they move around the spur track. The unload station 278 and the check-in station 280 are more fully described in the copending application of Ivan Johnson, Ser. No. 226,909.

Also coupled to a local station computer is one or more optical code readers, such as readers 284 and 286. Data from the optical code readers 284 and 286 is input to a local station computer 288 through interface logic 290 and transferred to the central computer 188 through communication interface 292. Local station status and functioning information is also transferred to the central computer 188 through communication interface 292.

Connected to the central computer 188 as part of the central controller are terminals 294 and 296. The input/output terminal 296 may be a typewriter console wherein selected data is generated by an operator to be input to the central computer 188 or selected data is generated by the computer to be displayed to an operator. The input terminal 296 may be a magnetic tape reader for inputing to the central computer 188 large amounts of input data. Such input data, for a baggage handling system, comprises a list of the unload stations and corresponding airline flight numbers to be serviced at any one unload station. Periodically throughout the use of the material handling system of the present invention, such data is input to the central computer 188 to enable the computer to compile routing data. The typewriter input/output 294 then functions as an input to update or correct any data input through the magnetic tape unit 296. The typewriter 294 also functions as an output to print out and display system status, accumulated data and daily logging information, and malfunction and error message information.

In operation of the central computer 188, stored in the computer memory is a list of unload stations 12 and corresponding flight numbers. As an agent at the console 184 enters a particular flight number (destination code) for a vehicle 178, the central computer, upon receipt of such data, compiles routing data which is then associated with a particular car identification data and transmitted to the various selected local station computers.

Figure 9:
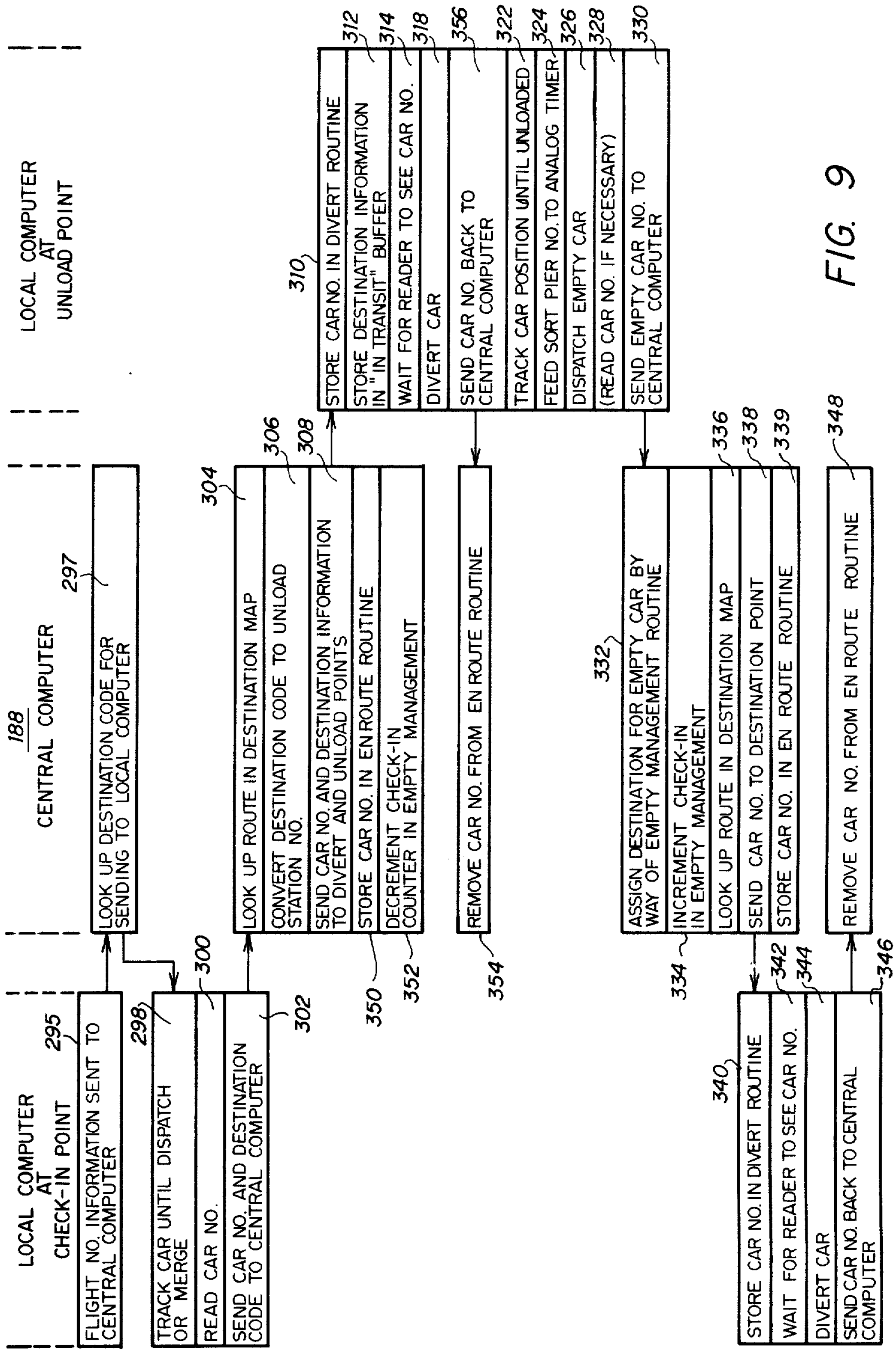
FIG. 9 is a flow chart of the program routine for guiding a material unit from a check-in station to a remote unload station.

Overall operation of the system is illustrated by the flow chart of FIG. 9. Prior to placing the system in operation, the central computer 188 is loaded with a table of destination codes and associated unload stations 12. A vehicle 178 is loaded at a check-in station 10 and an operator keys in the flight number (destination code) at the console 184. This data is input to the local remote station computer 288 and transferred to the central computer 188 during an operating sequence 295. At the central computer 188, the flight number is compared with the preprogrammed list of flight numbers and destination codes and the particular destination code is transmitted to the local station computer 288 in a sequence 297.

The loaded vehicle 178 now leaves the check-in station, still on the spur track, and the position of the vehicle is monitored at the magnetic stops during a sequence 298. Also during the sequence 298, the vehicle identification bar code is read by an optical code reader and this data is stored in the local computer 288. Both the car identification code and the destination code are then compiled into a single message during a sequence 302 and upon receiving a poll at the remote station computer 288, the message is sent to the central computer 188.

At the central computer 188, the identification code and destination code from a particular local remote station computer, also identified in the message, are utilized to compile routing data during a sequence 304. Also at the central computer the destination code is converted into an unload station number in a sequence 306 and this information along with the routing data are compiled into a single message and transmitted to selected local station computers at divert stations and the unload station during a sequence 308. At the selected local station computers, the routing data and unload code message are stored in memory during a sequence 310. This data is stored in an in-transit buffer during a sequence 312.

At any one time, a particular local station computer contains several routing messages for various vehicles in transit. As a vehicle passes an optical code reader, such as the reader 198, the vehicle identification data is transmitted to the associated local computer during a sequence 314. Where required, the vehicle is diverted from the main line 18 in a sequence 318.

Following completion of the divert of a vehicle from the main line 18, the local station computer at the divert station transfers the identification bar code back to the central computer 188 during a sequence 320. At the same time, the local computer, if at the unload station, tracks the vehicle's position until unloaded. This is completed in a sequence 322 to be followed by a sequence 324 to activate baggage sort equipment such as 210 or 274. An empty vehicle at an unload station is dispatched in a sequence 326 and as the vehicle passes the optical code reader, the identification bar code thereon is read during a sequence 328. Identification data is then transmitted to the local station computer wherein a message is compiled for transmitting to the central computer during a sequence 330.

At the central computer 188, a vehicle dispatched from an unload station is presumed to be empty and is assigned a destination code during an empty management routine 332. In the empty management routine 332, a list of check-in stations is checked for those requiring empty vehicles and this information is utilized in the generation of routing data for a selected check-in station. The requirement of a check-in station is determined from a running total of the number of empty vehicles in the storage queues at each of the check-in stations. The number of empty vehicles in the storage queue running total is incremented in a sequence 334 and routing data for the empty vehicle is compiled from the destination data in a sequence 336.

After the empty vehicle routing data has been compiled, the identification code and routing data are transmitted to the local station computer at the selected check-in station during a sequence 338. The car identification code is also stored in the en route routine in sequence 339. The routing message from the central computer 188 is stored in the local computer during a sequence 340. The local computer at the selected check-in station responds to vehicle identification code data from an optical code reader during a sequence 342. When the local computer identifies a particular identification code, a divert controller 272 is actuated during a sequence 344. At this time, the identification code for the diverted vehicle is transmitted to the computer 188 during a sequence 346. This data as received at the central computer 188 is utilized to remove the vehicle identification number from an en route routine during a sequence 348.

The en route routine of the central computer 188 maintains a running list of all vehicles in transit. At the time that the car identification code and the routing data are transmitted from the central computer during a sequence 308, the car identification code is also stored in the en route routing in a sequence 350. The central computer 188 also decrements the number of empty vehicles for that particular check-in station in the storage queue running totals in the empty management routine during a sequence 352. Thus, when a vehicle is dispatched from a check-in station the identification code therefor is stored in an en route routine and removed from the storage queue running total in the empty management routine. Vehicle identification codes are are also removed from the en route routine in a sequence 354 in response to data sent from a local station computer at the unload station during a sequence 356. When a vehicle remains too long in the en route routine and does not reach its destination due to a malfunction, the central computer 188 may then consider the vehicle to be lost and print out and display a malfunction message on tytpewriter 294, so that an operator may take corrective action.

The routine of FIG. 9 is completed continuously for each vehicle on the track layout of FIG. 1. The central computer provides the routing data for each vehicle, loaded or empty, as it leaves a particular check-in station 10 or a particular unload station 12. This routing data may include a high speed turnaround at one of the locations 16. A program listing for operation of the central computer 188 to compile the various routing data is given in Table I.

Table I includes the various subroutines to route a vehicle through the track layout to and from check-in stations 10 and to and from unload stations 12. This program is followed for each vehicle in the system.

TABLE I

```
PAGE  0001
            *   *** AA-DEW CAR GUIDANCE PROGRAM ***
            *
            *        J. G. PENN R    08/31/73
            *
            *
            *
                  NAM  CG+ENCAR
                  NAM  GETSTA
            *
      0000        ORG  0
            *
            *
            *
            *   "ENT R CAR" SUBROUTINE
            *
            *THIS SUBROUTINE PROVIDES THE INTERFACE BETWEEN
            *THE CAR GUIDANCE (CG) PROGRAM AND DESTINATION
            *PROCESSING OR EMPTY MANAGEMENT.  ON ENTRY, THE
            *X-REGISTER CONTAINS THE SORT PIER NUMBER IN THE
            *LEFT BYTE AND THE DESTINATION ADDRESS IN THE
            *RIGHT BYTE.  IF SORT PIER IS NOT NEEDED, IT
            *SHOULD BE SET TO ZERO.  THE A-REGISTER CONTAINS
            *THE ADDRESS OF THE ORIGINATING STATION, AND THE
            *OVERFLOW INDICATOR IS SET IF THE CAR IS LOADED,
            *RESET IF IT IS EMPTY.
```

TABLE I – Continued

```
0026                        *
0027                        *
0028                        *
0029   0000   0800   ENCAR  ENT
0030                        *
0031   0001   1028          ALX   1          SAVE INPUT
0032   0002   1148          RRX   1
0033   0003   E831          STX   WS+1
0034                        *
0035   0004   C010          CAI   16         IF STA IS STI,
0036   0005   C60C          LAP   12         SET CTR = 12
0037                        *
0038   0006   0310          NAR
0039   0007   9830          STA   WS         SET CTR
0040   0008   E200          LDX   STATEL     INITIAL ADDRESS

PAGE   0002
0041                        *
0042   0009   D830          IMS   WS         STEP & TEST CTR
0043   000A   F201          JMP   $+2
0044   000B   F202          JMP   $+3        HIT.
0045   000C   E400          LDX   :0         STEP TO NEXT STATION
0046   000D   F604          JMP   $-4
0047                        *
0048   000E   B031          LDA   WS+1       INSERT TABLE ENTRY
0049   000F   9C02          STA   :2         PUT IN 2ND POSITION.
0050   0010   8401          LDA   :1
0051   0011   3102          JAN   $+3        ENTRY IN 1ST POSITION?
0052   0012   EC02          EMA   :2         NO.  MOVE UP 2ND ENTRY.
0053   0013   9C01          STA   :1
0054   0014   F714          RTN   ENCAR
0055                        *
0056                        *
0057                        *
0058                        *
0059                        *  CAR GUIDANCE PROGRAM
0060                        *
0061                        *THIS PROGRAM IS ENTERED EACH TIME A TYPE 4 OR
0062                        *A TYPE 5 MESSAGE IS RECEIVED ON THE PARTY LINE.
0063                        *IT OPERATES STRICTLY FROM INFORMATION CONTAINED
0064                        *IN THE INPUT MESSAGE BUFFER (IBUF) AND THE CAR
0065                        *STATUS AND STATION STATUS TABLES.
0066                        *
0067                        *
0068   0015   0800   CG     ENT
0069                        *
0070   0016   0110          ZAR              SAVE INPUT PARAMETERS
0071   0017   E03C          LDX   IBUF
0072   0018   1E04          LLL   5
0073   0019   9AC3          STA   CAB        CABINET ADDRESS
0074   001A   0110          ZAR
0075   001B   1E02          LLL   3
0076   001C   9AC4          STA   MTYPE      MSG TYPE
0077   001D   0110          ZAR
0078   001E   1E07          LLL   8
0079   001F   D2A1          CMS   CARCNT     CHECK CAR NO.
0080   0020   F201          JMP   $+2

PAGE   0003
0081   0021   F70C          RTN   CG         TOO BIG!
0082   0022   9ABD          STA   CARNO      TELECAR NUMBER
0083                        *
0084   0023   0003          CAR              LOCATE CAR TABLE ENTRY
0085   0024   1051          ALA   2
0086   0025   8ABI          ADD   CARTBL
0087   0026   9ABB          STA   CARADR
0088                        *
0089   0027   0048          TAX              CAR TABLE ENTRY ADDR
0090   0028   B03C          LDA   IBUF
0091   0029   10D7          ARA   8
0092   002A   C065          CAI   :65        TYPE 5 MSG FROM AH1?
0093   002B   F204          JMP   CG01       YES.
0094                        *
0095   002C   F260          LDA   CAB        LOCATE STATION TABLE ENTRY.
0096   002D   F466          JST   GETSTA
0097   002E   EAAF          STX   CABADR
0098   002F   F212          JMP   CG1
0099                        *
0100   0030   B400   CG01   LDA   :0         CAR DISPATCHED?
0101   0031   3081          JAP   $+2        NO.
0102   0032   F35F          JMP   *CG17      YES.  CARRY ON.
0103                        *
0104                        *RE-ROUTE STRAY CAR TO C8.
0105   0033   B295          LDA   NSTAT      SET STATUS = 101001
0106   0034   FE0C          JST   *CG02      TO ASSC8
0107                        *
0108                        *INITIATE TLY MESSAGE FOR STRAY CAR
```

TABLE I – Continued

```
0109   0035   5801            ISA          IF DATA SWITCH # 1 SET
0110   0036   13C0            LAO
0111   0037   2201            JOS  $+2
0112   0038   F359            JMP  *CG17   TO BY-PASS PRINT
0113                  *
0114   0039   B2A6            LDA  CARNO
0115   003A   E292            LDX  DTTY01
0116   003B   1200            ROV
0117   003C   FE98            JST  *BDEC   CAR NO
0118                  *
0119   003D   C107            LAP  7
0120   003E   E28D            LDX  ATTY01

PAGE   0004
0121   003F   FE9C            JST  @TTYEN2
0122
0123   0040   F351            JMP  *CG17   TO SCANNER
0124                  *
0125   0041   01E3   CG02     DATA ASGC6
0126                  *
0127   0042   B29D   CG1      LDA  CARNO   CHECK CAR NO.
0128   0043   2135            JAZ  CG18
0129                  *
0130   0044   E29A            LDX  CARADR
0131   0045   B29E            LDA  MTYPE
0132   0046   C006            CAI  6       IS CAR LEAVING STA?
0133   0047   F204            JMP  CG15    YES
0134                  *
0135   0048   B400            LDA  ;0      IS CAR DISPATCHED?
0136   0049   3081            JAP  $+2
0137   004A   F297            JMP  CG2     YES.
0138   004B   F736            RTN  CC      NO. ILLEGAL MSG.
0139                  *
0140   004C   B400   CG15     LDA  ;0      RESET CAR STATUS
0141   004D   8278            AND  L2MASK  B=C=D=0.
0142   004E   A26C            IOR  B15     A=1.
0143   004F   A26D            IOR  CAB     ORIGINATING STATION.
0144   0050   9C00            STA  ;0
0145                  *
0146   0051   B400            LDA  ;0      IS CAR MARKED FOR
0147   0052   8265            AND  B11     MAINTENANCE DIVERT?
0148   0053   2108            JAZ  CG13    NO.
0149   0054   B400            LDA  ;0      YES. SET MAINTENANCE
0150   0055   A261            IOR  B10     "EN ROUTE" INDICATOR.
0151   0056   9C00            STA  ;0
0152   0057   E286            LDX  CABADR
0153   0058   B401            LDA  ;1      SET DEST TO C8/SP3.
0154   0059   8261            AND  B15
0155   005A   A265            IOR  C8MNT
0156   005B   9C01            STA  ;1
0157                  *
0158                  * MOVE DESTINATION INTO CAR TABLE
0159   005C   E281   CG13     LDX  CABADR
0160   005D   B401            LDA  ;1

PAGE   0005
0161   005E   E28D            LDX  CARADR
0162   005F   9C01            STA  ;1      F/E. SP. DEST
0163                  *
0164                  *GET ROUTING STATION ADDRESSES      *****
0165   0060   B27C            LDA  CAB
0166   0061   C010            CAI  16      IF ORIG STA IS ST1.
0167   0062   C60C            LAP  12      SELECT 12TH MAP INDEX
0168   0063   A250            IOR  LDXX0   LDX ;0
0169   0064   9A05            STA  CG11
0170   0065   B401            LDA  ;1      DEST
0171   0066   8263            AND  RMASK
0172   0067   A24B            IOR  CAI0    CAI 0
0173   0068   9A04            STA  CG12
0174                  *
0175   0069   E270            LDX  SYSMAP
0176   006A   0000   CG11     NOP          LDX ;(ORIG)
0177                  *
0178   006B   0128            IXR
0179   006C   B400            LDA  ;0
0180   006D   0000   CG12     NOP          CAI (DEST)
0181   006E   F202            JMP  $+3
0182   006F   30C4            JAP  $-4     FOR NEXT MAP ENTRY
0183   0070   0110   CG14     ZAR          NO INTERMEDIATE DIVERTS.
0184   0071   8252            AND  DMASK   ISOLATE DIVERT ADDR
0185                  *
0186   0072   E26C            LDX  CARADR  PUT DV ADDR INTO CARTBL
0187   0073   9C02            STA  ;2
0188                  *
0189                  *BUILD AND SEND DIVERT MESSAGES    ***
0190   0074   FE1E            JST  *CG19   TO GET TO DVMSG
0191                  *
```

TABLE I – Continued

```
0075  E269         LDX  CABADR
0076  C60A         LAP  10        T/O = TIMER + 10.
0077  8B63         ADD  *TIMER
0078  9C03         STA  :3
              *
              *PUT DISPATCH TIME INTO STATION TABLE QUEUE
0079  E264  CG18   LDX  CABADR
007A  E407         LDX  :EOQD     EOQ
007B  B35F         LDA  *TIMER
PAGE  0006
007C  3101         JAN  $+2       ALLOW NO ZERO ENTRIES
007D  0350         ARP
007E  9C00         STA  :0
              *
007F  E25E         LDX  CABADR
0080  DC07         IMS  :EOQD     STEP EOQ
0081  B407         LDA  :EOQD
0082  D400         CMS  :0        END OF QUEUE?
0083  F203         JMP  $+4       NO.
0084  0000         NOP            YES.
0085  B408         LDA  :Q1       START OVER
0086  9C07         STA  :EOQD
              *
0087  B404         LDA  :4        DECREMENT QUEUE CTR
0088  0000         DAR
0089  9C04         STA  :4
              *
008A  0110         ZAR            ADVANCE DEST QUEUE
008B  BC02         EMA  :2        ZERO 2ND.
008C  EC01         EMA  :1        2ND TO 1ST.
              *
008D  823C         AND  RMASK     INCREMENT
008E  2102         JAZ  $+3       CAR LEAVES W/O DISPATCH
008F  FA04         JST  GETSTA    DEST "CARS EN ROUTE" CTR
0090  DC03         IMS  :3
              *
0091  F300         JMP  *$+1      ON TO SCANNER.....
              *
0092  0150  CG17   DATA CG4
0093  018F  CG19   DATA DVMSG     FORWARDING ADDRESS
              *
              *
              *
              *    LOCATE STATION TABLE ENTRY ADDRESS
              *
0094  0800  GETSTA ENT
              *
0095  C010         CAI  16        IF STA IS ST1,
0096  C60C         LAP  12        SET CTR = 12.
              *

PAGE  0007
0097  E241         LDX  STATBL    INIT ADDR
0098  D225         CMS  C12
0099  F201         JMP  $+2
009A  F785         RTN  CG        ILLEGAL ADDR
              *
009B  0310         NAR
009C  9830         STA  WS        SET CTR
              *
009D  D830         IMS  WS        STEP & TEST CTR
009E  F201         JMP  $+2
009F  F70B         RTN  GETSTA    FOUND IT!
              *
00A0  E400         LDX  :0        NEXT ENTRY ADDR
00A1  F604         JMP  $-4
              *
              *
              *
              *    "RECORD CAR ARRIVAL" SUBROUTINE   ****
              *
00A2  0800  CARDV  ENT
              *
00A3  C608         LAP  8         IS CAR AT CB?
00A4  D238         CMS  CAB
00A5  F204         JMP  $+5       NO
00A6  F203         JMP  $+4       NO
00A7  B400         LDA  :0        YES.  RESET MAINT BITS.
00A8  8214         AND  CB1011
00A9  9C00         STA  :0
              *
00AA  B400         LDA  :0        CAR STATUS WORD
00AB  820A         AND  B0812     RESET DISP, ECHO, & EN ROUTE.
00AC  A230         IOR  CAB       ENTER CURRENT LOCATION ADDR.
00AD  9C00         STA  :0
              *
```

TABLE I–Continued

```
004E  E22F                LDX   CABACR
004F  DC04                IMS   24              QUEUE CTR
0080  FB01                JST   *TODERC         DECREMENT "EN ROUTE" COUNTER
                  *
0081  F70F                RTN   CARDY           XIT.....
0082  C1D7        TODERC  DATA  DERC            FORWARDING ADDRESS
PAGE  0008
                  *
                  *
                  *
                  *       INSTRUCTION CONSTANTS
                  *
0083  C000        CAIO    CAI   0
0084  E400        LDXXO   LDX   :0
0085  1E00        LLLO    LLL   1
                  *
                  *       MISC CONSTANTS
                  *
0086  1F00        PO812   DATA  :1F00
0087  0400        B10     DATA  :400
0088  0800        B11     DATA  :800
0089  1000        B12     DATA  :1000
008A  6000        B1314   DATA  :6000
008B  8000        B15     DATA  :8000
008C  C03F        BMASK   DATA  :3F
008D  F3FF        CB1011  DATA  :F3FF
008E  000C        C12     DATA  12
008F  012C        C300    DATA  300
00C0  0308        CHMNT   DATA  :308
00C1  0065        CARCNT  DATA  CARCT
00C2  7FFF        CMASK   DATA  :7FFF
00C3  0C00        DYAM12  DATA  :C00
00C4  7F00        DMASK   DATA  :7F00
00C5  EFFF        EMASK   DATA  :EFFF
00C6  0F00        L2MASK  DATA  :F00
00C7  E400        LSTAT   DATA  :E400
00C8  AC00        MSTAT   DATA  :AC00
00C9  A400        NSTAT   DATA  :A400
00CA  00FF        RMASK   DATA  :FF
00CB  0FC0        TMASK   DATA  :FC0
                  *
                  *       TELETYPE UTPUT MESSAGES
                  *
00CC  00CE        ATTY01  DATA  TTY01
00CD  0000        DTTY01  DATA  TTY01+2
00CE  A0C3        TTY01   TEXT  ' CAR XXX STRAY'
00CF  C1D2
PAGE  0009
0000  A0D8
0001  D8D8
0002  A0D3
0003  D4D2
0004  C1D9
                  *
                  *
                  *
                  *       EXTERNAL REFERENCE ADDRESSES
                  *
0005              BDEC    REF
0006              BUPIER  REF
0007              CARTEL  REF
0008              EMGTRR  REF
0009              STATEL  REF
000A              SYSMAP  REF
000B              TIMER   REF
000C              TTYENQ  REF
                  *
                  *
                  *
                  *       TEMPORARY STORAGE
                  *
00DD  0000        CAB     DATA  0               CABINET ADDRESS
00DE  0000        CABADR  DATA  0               STATION TABLE ENTRY ADDRESS
00DF  0000        CARADR  DATA  0               CAR TABLE ENTRY ADDR
00E0  0000        CARNO   DATA  0               CAR NUMBER
00E1  0000        MTYPE   DATA  0               MESSAGE TYPE
                  *
                  *
                  *
                  *
00E2  B400        CG2     LDA   :0              IS ECHO SET?
00E3  1350                LLA   1
00E4  208E                JAM   CG23            IF YES.
                  *
00E5  B401                LDA   :1              IS MSG FROM DEST?
```

TABLE I – Continued

```
00E6  861C              AND   RMASK
00E7  D60A              CMS   CAB
00E8  F267              JMP   CG4        NO
PAGE  0010
00E9  F266              JMP   CG4        NO

00EA  B400   CG22       LDA   :0         SET ECHO AND MARK CAR
00EB  A531              IOR   B1514      "EN ROUTE"
00EC  9C00              STA   :0
                *
00ED  8634              AND   B12        CHECK RE-ROUTE BIT
00EE  3103              JAN   $+4        IF SET, DO NOT RESET TIMER.
                *
00EF  E650              LDA   C300       T/O = TIMER + 300.
00F0  8F15              ADD   *TIMER     (5 MINUTES)
00F1  9C03              STA   :3
                *
00F2  F25D              JMP   CG4
                *
                *
00F3  B401   CG23       LDA   :1         IS MSG FROM DEST?
00F4  862A              AND   RMASK
00F5  D618              CMS   CAB
00F6  F259              JMP   CG4        NO
00F7  F258              JMP   CG4        NO
                *
00F8  E617              LDA   MTYPE      YES.  CHECK MSG TYPE.
00F9  C005              CAI   5
00FA  F202              JMP   CG26       IF TYPE 5.
                *
00FB  FE59              JST   CARDV      RECORD ARRIVAL OF CAR
00FC  F253              JMP   CG4
                *
00FD  B400   CG26       LDA   :0         RESET ECHO INDICATOR
00FE  8639              AND   EMASK
00FF  9C00              STA   :0
                *
                *
0100  B401   CG3        LDA   :1         IS CAR EMPTY?
0101  2090              JAM   CG31       IF NOT
                *
0102  E624              LDX   CABACR     DECREMENT
0103  FAD3              JST   DERC       "EN ROUTE" CTR
                *
PAGE  0011
0104  E627              LDA   CAB        FOR THIS CAR.
0105  FF2D              JST   *EMGTRR    GET A NEW DEST FROM E/MGT.
                *
0106  E627              LDX   CARADR
0107  9C01              STA   :1
0128  863E              AND   RMASK
                *
0109  FE75              JST   GETSTA     NEW DEST.  INCREMENT
010A  DC03              IMS   :3         "CARS EN ROUTE" CTR
                *
010B  E62C              LDX   CARADR
010C  0110              ZAR
010D  9C02              STA   :2         ZERO DIVERTS
010E  C60A              LAP   10
010F  8F34              ADD   *TIMER
0110  9C03              STA   :3         T/O = TIMER + 10.
                *
0111  F239              JMP   CG33
                *
                *CHECK FOR DESTINATION FAULT
0112  B401   CG31       LDA   :1
0113  8649              AND   EMASK
0114  A65F              IOR   LLLO
0115  9A02              STA   $+3
0116  0110              ZAR
0117  E65C              LDX   E15
0118  0000              NOP              LLL(DEST)
0119  8030              AND   EMSSCP
011A  2132              JAZ   CG34       IF FAULT NOT SET
                *
                *    LOOK UP SORT PIER NUMBER
011B  E53C              LDX   CARADR
011C  B401              LDA   :1         PIER/DST
011D  965B              AND   CMASK
011E  0048              TAX
011F  1307              LRA   8
0120  C10A              CXI   10         U2?
0121  8AE3              ADD   ADU1       SP = PIER+9
0122  C10B              CXI   11         U3?
0123  8AE4              ADD   C17        SP = PIER+17
```

TABLE I – Continued

```
PAGE  0012
                    *
                    *   FIND BACKUP TABLE ENTRY FOR THIS PIER
0124  0000              DAR
0125  8E4F              ADD  BUPIER
0126  0048              TAX
                    *
                    *   IS BACK-UP PIER ASSIGNED?
0127  B400              LDA  :0
0128  866C              AND  PMASK
0129  2123              JAZ  CG34      IF NOT
                    *
                    *   IS BACK-UP ASSIGNMENT CONFIRMED?
012A  9830              STA  WS        BACK-UP PIER NO.
012B  0000              DAR
012C  8E56              ADD  BUPIER
012D  0048              TAX
012E  B400              LDA  :0
012F  209C              JAM  CG34      IF B.U. PIER ALSO HAS FAILED
0130  8665              AND  TMASK
0131  211E              JAZ  CG34      IF B.U. NOT CONFIRMED
                    *
                    *   CONVERT SORT PIER TO DEST AND RELATIVE PIER NO.
0132  B030              LDA  WS
0133  0202              CMS  C10
0134  F20C              JMP  CG36      U1
0135  0000              NOP
0136  0202              CMS  C18
0137  F205              JMP  CG35      U2
0138  0000              NOP
                    *
0139  92CE              SUB  C17       U3. PIER = SP-17
013A  1357              LLA  8
013B  A2CB              IOR  C11       PIER/U3
013C  F206              JMP  CG37
                    *
013D  92C7  CG35        SUB  ADU1      U2. PIER = SP-9
013E  1357              LLA  8
013F  A2C6              IOR  C10       PIER/U2
0140  F202              JMP  CG37
                    *

PAGE  0013
0141  1357  CG36        LLA  8
0142  A2C2              IOR  ADU1      PIER/U1
                    *
0143  A688  CG37        IOR  B15       SET "LOADED CAR" BIT
                    *
                    *   PUT NEW ROUTING INFORMATION INTO CAR TABLE
0144  E665              LDX  CARADR    NEW DEST/PIER
0145  9C01              STA  :1
                    *
0146  B683              LDA  DVAM12    SET DIVERTS AM1 & AM2
0147  9C02              STA  :2
                    *
                    *SET RE-ROUTE INDICATOR
0148  B400              LDA  :0
0149  A690              IOR  B12
014A  9C00              STA  :0
                    *
                    *BUILD AND SEND DIVERT MSGS ****
014B  FA43  CG33        JST  DVMSG
014C  F203              JMP  CG4
                    *
014D  E665  CG34        LDX  CARADR    RE-ROUTE CAR TO C8
014E  B687              LDA  LSTAT     SET STATUS = 101101
014F  FA93              JST  ASGCB
                    *
                    *
                    *
                    *SCAN CAR STATUS TABLE FOR TIME-OUTS  *****
                    *
0150  E679  CG4         LDX  CARTBL    INITIAL TABLE ENTRY ADDR
0151  C765              LAM  CARCT
0152  9E75              STA  CAB       SET CTR
0153  0350              ARP            SET CAR NO = 1
0154  9E74              STA  CARNO
                    *
0155  EE76  CG41        STX  CARADR
0156  B400              LDA  :0        CAR DISPATCHED?
0157  2081              JAM  $+2       YES.
0158  F22F              JMP  CG43      NO..
                    *
```

TABLE I—Continued

```
PAGE 0014
                        *CHECK FOR MAINTENANCE REQUEST *****
0159  8641              AND  B11       MAINT REQUEST BIT SET?
015A  2106              JAZ  CG42      NO.
                        *
015B  E400              LDA  :0        YES.
015C  86A5              AND  B10       IS "EN ROUTE" BIT SET?
015D  3103              JAN  CG42      YES.
                        *
015E  B696              LDA  MSTAT     NO.  SET STATUS = 101011
015F  FA83              JST  ASGCB     RE-ROUTE CAR TO CB
                        *
0160  F227              JMP  CG43
                        *
                        *
0161  B786        CG42  LDA  *TIMER    TIME-OUT?
0162  D403              CMS  :3
0163  F224              JMP  CG43      NO
0164  0000              NOP            YES
                        *
                        *    INITIATE TTY MESSAGE FOR LOST CAR
0165  5801              ISA            IF DATA SWITCH # 1 IS SET
0166  13C0              LAO
0167  3210              JOR  CG44      TO BY-PASS PRINT
                        *
0168  E689              LDX  CARADR    GET DEST AND CONVERT
0169  B401              LDA  :1        TO ASCII.
016A  86AD              AND  RMASK
016B  D299              CMS  ADUL
016C  F204              JMP  $+5       IF CHECK-IN
016D  0000              NOP            IF UNLOAD
016E  9295              SUB  ADCB
016F  A29B              IOR  ADULO
0170  F201              JMP  $+2
0171  A298              IOR  ADCIO
0172  9AC4              STA  TTY03+7
                        *
0173  B400              LDA  :0        SELECT REASON FOR
0174  829C              AND  B14       T/O & PUT IN MSG.
0175  2104              JAZ  $+5
0176  B2B3              LDA  DESTXT    DEST INOPERATIV

PAGE 0015
0177  9AC1              STA  TTY03+9
0178  B2B2              LDA  DESTXT+1
0179  F203              JMP  $+4
017A  B2B1              LDA  ECHTXT    ECHO NOT SENT
017B  9ABD              STA  TTY03+9
017C  B2B0              LDA  ECHTXT+1
017D  9ABC              STA  TTY03+10
                        *
017E  E2B0              LDX  DTTY03    PUT CAR NO IN MSG
017F  B69F              LDA  CARNO
0180  1200              ROV
0181  FFAC              JST  *BDEC
                        *
0182  C60B              LAP  11
0183  E2AA              LDX  ATTY03    PRINT
0184  FEA8              JST  *TTYENG   "CAR XXX T/O  XX  XXXX"
                        *
0185  E6A6        CG44  LDX  CARADR
0186  B6B0              LDA  NSTAT     SET STATUS = 101001
0187  FA5B              JST  ASGCB     RE-ROUTE CAR TO CB
                        *
0188  E6A9        CG43  LDX  CARADR    STEP TO NEXT ENTRY
0189  C204              AXI  4
018A  DEAA              IMS  CARNO     BUMP CAR NO
018B  DEAE              IMS  CAR       CTR
018C  F637              JMP  CG41
                        *
018D  F300              RTN  FWDCG     EXIT....
                        *
018E  8015       FWDCG  DATA *CG       FORWARDING ADDRESS
                        *
                        *
                        *
                        *    DIVERT MESSAGE SUBROUTINE
                        *
018F  0800       DVMSG  ENT
                        *
0190  C70B              LAM  11        INIT DIVERT LIST SCAN
0191  9A85              STA  DVCTR
0192  E285              LDA  DVLADR
```

TABLE I—Continued

```
PAGE 0016
0193  9AB2              STA  DVADR
0194  E6B5              LDX  CARADR     RETRIEVE DEST FOR SCAN
0195  B401              LDA  =1
0196  1357              LLA  8
0197  1352              LLA  3
0198  9A7A              STA  DEST
                  *
0199  B37C   DVM1       LDA  *DVADR     SCAN DIVERT LIST
019A  D278              CMS  DEST
019B  F20D              JMP  DVM2
019C  F20C              JMP  DVM2
                  *
019D  A287              IOR  MT4        SEND TYPE 4 + CAR NO.
019E  A6BE              IOR  CARNO      TO DEST
019F  FB36              JST  *PLCTX
                  *
01A0  E6C1              LDX  CARADR     SEND TYPE 5 + PIER NO.
01A1  B401              LDA  =1         TO DEST
01A2  B285              AND  PMASK
01A3  2108              JAZ  DVM3
01A4  13D7              LRA  8
01A5  A280              IOR  MT5
01A6  A36F              IOR  *DVADR
01A7  FB2E              JST  *PLCTX
01A8  F203              JMP  DVM3
                  *
01A9  A27D   DVM2       IOR  MT6        SEND "CLEAR" TO ALL
01AA  A6CA              IOR  CARNO      STATIONS EXCEPT DEST
01AB  FB2A              JST  *PLCTX
                  *
01AC  DA69   DVM3       IMS  DVADR      STEP TO NEXT STATION
01AD  DA69              IMS  DVCTR
01AE  F615              JMP  DVM1
                  *
01AF  0110              ZAR             CLEAR MERGE DIVERTS
01B0  9A63              STA  DVT1
01B1  9A63              STA  DVT2
                  *
01B2  E6D3              LDX  CARADR     CHECK DV1
01B3  B402              LDA  =2

PAGE 0017
01B4  B273              AND  PMASK
01B5  2105              JAZ  DVM4
01B6  1352              LLA  3
01B7  9A5C              STA  DVT1
01B8  A26C              IOR  MT4        SEND DIVERT MSG
01B9  A6D9              IOR  CARNO
01BA  FB1B              JST  *PLCTX
                  *
01BB  E6DC   DVM4       LDX  CARADR     CHECK DV2
01BC  B402              LDA  =2
01BD  1357              LLA  8
01BE  2105              JAZ  DVM5
01BF  1352              LLA  3
01C0  9A54              STA  DVT2
01C1  A263              IOR  MT4        SEND DIVERT MSG
01C2  A6E2              IOR  CARNO
01C3  FB12              JST  *PLCTX
                  *
01C4  B247   DVM5       LDA  AMLIST     CHECK AM1
01C5  FA03              JST  DVM6
01C6  B246              LDA  AMLIST+1   CHECK AM2
01C7  FA01              JST  DVM6
                  *
01C8  F739              RTN  DVMSG      EXIT....
                  *
01C9  0800   DVM6       ENT
01CA  D249              CMS  DVT1
01CB  F202              JMP  $+3
01CC  F201              JMP  $+2
01CD  F704              RTN  DVM6
                  *
01CE  D246              CMS  DVT2
01CF  F202              JMP  $+3
01D0  F201              JMP  $+2
01D1  F708              RTN  DVM6
                  *
01D2  A254              IOR  MT6        SEND "CLEAR" TO AM1 OR AM2
01D3  A6F3              IOR  CARNO      IF NOT IN DIVERT LIST
01D4  FE01              JST  *PLCTX
                  *
```

TABLE I – Continued

```
PAGE 0018
0 1D5  F70C           RTN  DVMA
                *
                *
01D6                  PLCIX  REF
                *
                *
                *  ROUTINE TO DECREMENT "CARS EN ROUTE" COUNTER
01D7  0800      DERC  ENT
                *
01D8  B403            LDA  :3        SAVE STATUS BITS
01D9  824A            AND  LMASK
01DA  9831            STA  WS+1
                *
01DB  B403            LDA  :3        DECREMENT CTR
01DC  0030            DAR
01DD  8230            AND  B0005     LIMIT CTR TO 63.
01DE  C03F            CAI  63        CLEAR CTR IF = 63.
01DF  0110            ZAR
01E0  A031            IOR  WS+1      MERGE IN STATUS BITS
01E1  9C03            STA  :3
                *
01E2  F70B            RTN  DERC
                *
                *
                *
                *
                *     ROUTINE TO RE-ROUTE CAR TO C8   ***
                *
                *
01E3  0800      ASGC8 ENT
                *
01E4  9830            STA  WS        STATUS.
01E5  1301            LRA  2
01E6  8228            AND  B0809
01E7  9831            STA  WS+1      PIER NO.
                *
01E8  B400            LDA  :0        SET STATUS
01E9  823F            AND  SMASK
01EA  A030            IOR  WS
01EB  9C00            STA  :0

PAGE 0019
                *
01EC  B225            LDA  C8DES     SET DEST = C8/P3 OR C8/P1
01ED  A031            IOR  WS+1
01EE  BC01            EMA  :1
01EF  821E            AND  B0005
01F0  9A22            STA  DEST      SAVE OLD DEST
                *
01F1  C600            LAP  :D        SET DIV = AM2
01F2  9C02            STA  :2
                *
01F3  B400            LDA  :0        CHECK RE-ROUTE BIT
01F4  821B            AND  B12A
01F5  3103            JAN  $+4       BY-PASS TIMER RESET IF SET
                *
01F6  C60A            LAP  10        SET T/O = TIMER + 10.
01F7  8B09            ADD  *ASGREF
01F8  9C03            STA  :3
                *
                *DECREMENT DEST STA "CARS EN ROUTE" CTR
01F9  B219            LDA  DEST
01FA  FB07            JST  *ASGREF+1
01FB  FE24            JST  DERC
                *
                *INCREMENT C8 "CARS EN ROUTE" CTR
01FC  E306            LDX  *ASGREF+2
01FD  C2A8            AXI  168
01FE  DC03            IMS  :3
                *
                *BUILD AND SEND DIVERT MESSAGES
01FF  FE70            JST  DVMSG
0200  F710            RTN  ASGC8     EXIT.....
                *
0201  800B      ASGREF DATA *TIMER
0202  0094            DATA GETSTA
0203  0009            DATA STATEL
                *
                *
0204  0008      ADC8  DATA 8
0205  0009      ADC9  DATA 9
0206  000A      C10   DATA 10
```

TABLE I—Continued

```
PAGE 0020
     0207  000B  C11     DATA 11
     0208  0011  C17     DATA 17
     0209  0012  C18     DATA 18
     020A  C3E0  ADC10   DATA :C3E0
     020B  C5E0  BLC10   DATA :C5E0
     020C  6000  AMLIST  DATA :6000,:6800
     020D  6800
     020E  003F  BOUNS   DATA :3F
     020F  0300  B300R   DATA :300
     0210  1000  B122    DATA :1000
     0211  4000  B14     DATA :4000
     0212  8106  CODES   DATA :8106
     0213  0000  DEST    DATA 0
     0214  0000  DVT1    DATA 0
     0215  0000  DVT2    DATA 0
     0216  0000  DVADR   DATA 0
     0217  0000  DVCTR   DATA 0
     0218  0219  DVLADR  DATA DVLIST
     0219  0800  DVLIST  DATA :800,:1800,:2000,:2800
     021A  1800
     021B  2000
     021C  2800
     021D  3000          DATA :3000,:3800,:4000,:4800
     021E  3800
     021F  4000
     0220  4800
     0221  5000          DATA :5000,:5800,:8000
     0222  5800
     0223  8000
     0224  FF00  LMASK   DATA :FF00
     0225  0400  MT4     DATA :400
     0226  0500  MT5     DATA :500
     0227  0600  MT6     DATA :600
     0228  7F00  PMASK   DATA :7F00
     0229  03FF  SMASK   DATA :3FF
                 *
                 *
     022A  C4C5  DESTXT  TEXT 'DEST'
     022B  D3D4
     022C  C5C3  ECHTXT  TEXT 'ECHO'
PAGE 0021
     022D  C8CF
                 *
     022E  0230  AITY03  DATA TTY03
     022F  0232  DTTY03  DATA TTY03+2
     0230  A0C3  TTY03   TEXT ' CAR XXX T/O  XX  XXXX'
     0231  C1D2
     0232  A0D8
     0233  D8D8
     0234  A0D4
     0235  AFCF
     0236  A0A0
     0237  D8D8
     0238  A0A0
     0239  D8D8
     023A  D8D8
                 *
                 *    QUATES    *****
                 *
           0007  EOCD    EQU  7
           0008  Q1      EQU  EOCD+1
           0065  CARCT   EQU  101
           0030  AS      EQU  48
           003C  IBUF    EQU  60
           003D  FMSSDP  EQU  IBUF+1
                 *
                 *
                 *
           0000          END  0
0000 ERRORS
```

While only one embodiment of the invention, together with modifications thereof, has been described in detail herein and shown in the accompanying drawings, it will be evident that various further modifications are possible without departing from the scope of the invention.

What is claimed is:

1. In a material handling system, the combination which comprises:
   - a plurality of material handling units each having a fixed identification code;
   - a code reader at a dispatch station generating identification data representing identification codes carried by the individual material units;

a central controller receiving the identification codes from the code reader at the dispatch station and maintaining a file of unit destination codes and corresponding unit identification codes to generate routing data therefrom and including means for tracking a material handling unit through the system by individual unit identification codes;

an array of optical code readers at change of direction locations throughout the system each generating identification data representing the unit identification code carried by a passing material unit;

a local controller responsive to the identification data from one of the array of optical code readers and receiving the routing data from said central controller to generate a unit direction signal to the change of direction location;

a code reader at an unload station generating identification data representing an identification code carried by a passing material unit; and a local controller responsive to the identification data from the code reader at the unload station and receiving the routing data from said central controller to generate a direction signal to the unload station to divert a selected material handling unit to be unloaded.

2. In a material handling system as set forth in claim 1 wherein said central controller includes means for transmitting routing data to each of the local controllers.

3. In a material handling system as set forth in claim 1 including means for generating unit destination codes to the central controller for a selected unit identification code.

4. A material handling system as set forth in claim 1 wherein said central controller includes means for monitoring the status and functioning of the local station and means for displaying and printing out station and system status and functioning.

5. In a material handling system as set forth in claim 1 wherein the identification code for each material handling unit comprises a bar code and the optical code reader responds to alternate light and dark areas of the bar arrangement.

6. In a material handling system as set forth in claim 5 wherein each material handling unit includes an identification bar code with redundant information for error detection.

7. A material handling system, comprising in combination:

a dispatch station for discharging material handling units each carrying a fixed identification code;

an optical code reader at said dispatch station generating identification data representing the identification code carried by individual material units;

a central controller receiving the identification codes from the code reader at the dispatch station and maintaining a file of unit destination codes and corresponding identification codes to generate routing data therefrom and including means for tracking a material handling unit through the system by individual unit identification codes;

a plurality of change of direction switching stations for controlling the routing of each of the material units through the system;

an array of optical code readers individually positioned at a change of direction switching station and each generating identification data representing the identification code carried by a passing material unit;

a local controller responsive to the identification data from one of the array of optical code readers and receiving the routing data from said central controller to generate a unit direction signal to the respective change of direction switching stations;

an unload station for receiving routing material handling units diverted thereto through one or more change of direction switching stations;

an optical code reader at the unload station generating identification data representing the identification code carried by a passing individual material unit; and a local controller responsive to the identification data from the code reader at the unload station and receiving the routing data from said central controller to generate a direction signal to the unload station to divert a selected material handling unit to be unloaded.

8. A material handling system as set forth in claim 7 including means for generating clear track signals to the individual local controllers; and wherein a responsive local controller generates an energizing signal to control the movement of material handling units through the system.

9. A material handling system as set forth in claim 8 wherein said means for generating clear track signals includes optical sensors to provide a signal when a material unit interrupts an optical path.

10. A material handling system as set forth in claim 7 wherein said dispatch station includes means for generating unit destination codes to the central controller for a selected unit identification code.

11. A material handling system as set forth in claim 10 wherein said central controller includes means for transmitting routing data to each of the local storage controllers.

12. A method of routing individual material handling units carrying an assigned fixed identification code through a track layout, comprising the steps of:

generating identification data by means of an optical code reader responsive to the identification code of the material handling unit at a dispatch station;

storing the identification data in a central controller maintaining a file of unit destination codes and corresponding identification codes and generating routing data therefrom;

transferring the destination code and a preselected unit identification code as routing data to selected optical code readers at change of direction switching locations and to the optical code reader of a selected unload station;

optically reading the identification code of a material unit approaching a change of direction location;

generating a unit direction signal by a comparison of the read identification code with the transferred identification code to divert a material unit to the selected unload station;

generating an empty destination code for storing with the unit identification code in the central controller;

transferring the empty destination code and a preselected unit identification code as routing data to selected optical code readers at change of direction switching locations and to the optical code reader of a selected dispatch station;

optically reading the identification code of a material handling unit approaching a change of direction location; and generating a unit direction signal by a comparison of the read identification code with the transferred identification code to divert a material handling unit to a dispatch station.

13. A method of routing individual material handling units carrying an assigned fixed identification code through a track layout, comprising the steps of:

generating identification data by means of an optical code reader responsive to the identification code of a material handling unit at a dispatch station;

storing the identification data in a central controller maintaining a file of unit destination codes and corresponding identification codes and generating routing data therefrom;

transferring the destination code and a preselected unit identification code as routing data to selected optical code readers at change of direction switching locations and to the optical code reader of a selected unload station;

optically reading the identification code of a material unit approaching a change of direction location;

generating a unit direction signal by a comparison of the read identification code with the transferred identification code to divert a material unit to the selected unload station; and storing a unit identification code in the central controller in an in-route routine for material handling unit tracking and for detecting lost units.

14. A material handling system, comprising in combination:

a dispatch station for discharging material handling units each carrying an identification code;

an optical code reader at said dispatch station generating identification data representing the identification code carried by individual material units;

a central controller receiving the identification codes from the code reader at the dispatch station and maintaining a file of unit destination codes and corresponding identification codes to generate routing data therefrom and including means for tracking a material handling unit through the system by individual unit identification codes;

a plurality of change of direction switching stations for controlling the routing of each of the material units through the system;

an unload station for receiving routed material handling units diverted thereto through one or more change of direction switching stations;

an optical code reader at the unload station generating identification data representing the identification code carried by a passing individual material unit; and a local controller responsive to the identification data from the code reader at the unload station and receiving the routing data from said central controller to generate a direction signal to the unload station to divert a selected material handling unit to be unloaded.

15. A method of routing individual material handling units carrying an assigned fixed identification code through a track layout, comprising the steps of:

generating identification data by means of an optical code reader responsive to the identification code of a material handling unit at a dispatch station;

storing the identification data in a central controller maintaining a file of unit destination codes and corresponding identification codes and generating routing data therefrom;

transferring the destination code and a preselected unit identification code as routing data to selected optical code readers at change of direction switching locations and to the optical code reader of a selected unload station;

optically reading the identification code of a material unit approaching a change of direction location;

generating a unit direction signal by a comparison of the read identification code with the transferred identification code to divert a material unit to the selected unload station; and generating clear track signals to local controllers at change of direction locations to control priority of movement of material handling units through the system.

16. A material handling system, comprising in combination:

a dispatch station for discharging material handling units each carrying a fixed identification code;

an optical code reader at said dispatch station generating identification data representing the identification code carried by individual material units;

a central controller receiving the identification codes from the code reader at the dispatch station and maintaining a file of unit destination codes and corresponding identification codes to generate routing data therefrom including clear track signals;

a plurality of change of direction switching stations for controlling the routing of each of the material units through the system;

an array of optical code readers individually positioned at a change of direction switching station and each generating identification data representing the identification codes carried by a passing material unit;

a local controller responsive to the identification data from one of the array of optical code readers and receiving the routing data from said central controller to generate a unit direction signal to the respective change of direction switching stations;

an unload station for receiving routed material handling units diverted thereto through one or more change of direction switching stations;

an optical code reader at the unload station generating identification data representing the identification code carried by a passing individual material unit; and a local controller responsive to the identification data from the code reader at the unload station and receiving the routing data and clear track signals from the central controller to generate either an energizing signal to control the movement of material handling units through the system or to generate a direction signal to the unload station to divert a selected material handling unit to be unloaded.

17. A material handling system as set forth in claim 16 wherein said means for generating clear track signals includes optical sensors to provide a signal when a material unit interrupts an optical path.

* * * * *

PO-1050
(5/69)

UNITED STATES PATENT OFFICE

CERTIFICATE OF CORRECTION

Patent No. 3,908,113 Dated September 23, 1975

Inventor(s) Kenneth Y. Maxham and Richard A. Houghton

It is certified that error appears in the above-identified patent and that said Letters Patent are hereby corrected as shown below:

Col. 4, line 18, after "signals" delete "switch";
line 24, change "swithc" to --switch--;
line 38, after "system." insert --The vehicle then leaves the check-in station and is--.

Col. 6, line 57, change "applied" to --supplied--.

Col. 8, line 28, change "FIg." to --FIG.--.

Col. 12, line 12, change "routing" to --routine--;
line 28, change "tytpewriter" to --typewriter--.

Signed and Sealed this

*sixth* Day of *January 1976*

[SEAL]

*Attest:*

RUTH C. MASON
*Attesting Officer*

C. MARSHALL DANN
*Commissioner of Patents and Trademarks*